(12) United States Patent
Dingli et al.

(10) Patent No.: US 11,987,172 B1
(45) Date of Patent: May 21, 2024

(54) AUTOMATIC CONTROL OF HIGH BEAM OPERATION

(71) Applicant: PlusAI, Inc., Santa Clara, CA (US)

(72) Inventors: Robert Joseph Dingli, Cupertino, CA (US); Chaozhe He, New York, NY (US)

(73) Assignee: PlusAI, Inc., Santa Clara, CA (US)

( * ) Notice: Subject to any disclaimer, the term of this patent is extended or adjusted under 35 U.S.C. 154(b) by 0 days.

(21) Appl. No.: 18/099,181

(22) Filed: Jan. 19, 2023

(51) Int. Cl.
*B60Q 1/14* (2006.01)
*B60W 60/00* (2020.01)
*F21S 41/663* (2018.01)

(52) U.S. Cl.
CPC ......... *B60Q 1/1423* (2013.01); *B60W 60/005* (2020.02); *F21S 41/663* (2018.01); *B60W 2554/4026* (2020.02); *B60W 2554/4029* (2020.02); *B60W 2556/40* (2020.02)

(58) Field of Classification Search
CPC .. B60Q 1/1423; F21S 41/663; B60W 60/005; B60W 2554/4026; B60W 2554/4029; B60W 2556/40
USPC .......................................................... 701/23
See application file for complete search history.

(56) References Cited

U.S. PATENT DOCUMENTS

| | | | | |
|---|---|---|---|---|
| 3,830,570 A * | 8/1974 | Groetzner | ............ | G01M 11/061 356/399 |
| 9,278,644 B2 * | 3/2016 | Lee | ......................... | B60Q 1/085 |
| 11,159,645 B2 * | 10/2021 | Iyer | ........................... | H04L 47/32 |
| 2012/0002430 A1 * | 1/2012 | Yamazaki | ................ | B60Q 1/10 362/464 |
| 2012/0203427 A1 * | 8/2012 | Ehlgen | ................... | B60Q 1/143 701/36 |
| 2013/0219294 A1 * | 8/2013 | Goldman-Shenhar | | B60H 1/00742 715/751 |
| 2013/0274999 A1 * | 10/2013 | Bengtsson | ............. | B60Q 1/525 701/36 |
| 2015/0109445 A1 * | 4/2015 | Wedajo | .................. | G03B 17/18 348/148 |
| 2016/0097364 A1 * | 4/2016 | Mikami | ............. | F02N 11/0862 701/102 |
| 2016/0180707 A1 * | 6/2016 | MacNeille | ............ | B60W 40/04 701/117 |
| 2016/0336479 A1 * | 11/2016 | Miyachi | ................... | H01L 33/08 |
| 2017/0066367 A1 * | 3/2017 | Illium | ...................... | B60Q 1/16 |
| 2018/0083901 A1 * | 3/2018 | McGregor, Jr. | ......... | H04L 51/02 |
| 2018/0087732 A1 * | 3/2018 | De Lamberterie | ..... | F21S 41/16 |
| 2018/0174449 A1 * | 6/2018 | Nguyen | ................. | G08G 1/015 |
| 2019/0128497 A1 * | 5/2019 | Tessnow | ................ | F21S 41/151 |
| 2019/0195457 A1 * | 6/2019 | Toko | ....................... | F21S 41/25 |
| 2019/0273828 A1 * | 9/2019 | Wrobel, Jr. | ........... | H04W 24/08 |
| 2019/0359121 A1 * | 11/2019 | Shimada | ................ | H04N 23/90 |
| 2020/0029194 A1 * | 1/2020 | Speaker | ................ | H04W 4/027 |
| 2021/0146821 A1 * | 5/2021 | Yoon | ....................... | G06V 20/20 |
| 2021/0213873 A1 * | 7/2021 | Martin | ................... | B60Q 1/085 |

(Continued)

*Primary Examiner* — Richard A Goldman
(74) *Attorney, Agent, or Firm* — Sheppard Mullin Richter & Hampton LLP

(57) ABSTRACT

Methods, systems, and non-transitory computer readable media are configured to perform operations comprising determining a plurality of predetermined situations in which lighting operation of an ego vehicle should automatically transition; determining occurrence of a predetermined situation of the plurality of predetermined situations; and causing an automatic transition in lighting operation of the ego vehicle.

20 Claims, 8 Drawing Sheets

(56) References Cited

U.S. PATENT DOCUMENTS

2022/0153374 A1* 5/2022 Saeki .................. B62J 45/20
2022/0297635 A1* 9/2022 Fang .................. B60R 16/023
2023/0058323 A1* 2/2023 Sheng ................. F21S 41/63

* cited by examiner

FIGURE 4B

AUTOMATIC CONTROL OF HIGH BEAM OPERATION

FIELD OF THE INVENTION

The present technology relates to vehicle systems. More particularly, the present technology relates to automatic control of vehicle high beam headlights.

BACKGROUND

Some vehicles can have both a manual mode of navigation and an autonomous mode of navigation. For example, in an autonomous mode of navigation, which can have different levels of autonomy, motion of a vehicle can be planned and controlled. Planning and control functions in the autonomous mode of navigation rely in part on data about the vehicle and an environment in which the vehicle is traveling, including the position and movement of other vehicles and objects. In the autonomous mode of navigation, various subsystems of the vehicle can be automatically controlled. Even when the vehicle is in a manual mode of navigation, certain subsystems of the vehicle, such as a lighting subsystem, can provide automatic assistance to the driver.

SUMMARY

Various embodiments of the present technology can include methods, systems, and non-transitory computer readable media configured to perform operations comprising determining a plurality of predetermined situations in which lighting operation of an ego vehicle should automatically transition; determining occurrence of a predetermined situation of the plurality of predetermined situations; and causing an automatic transition in lighting operation of the ego vehicle.

In some embodiments, the automatic transition in lighting operation of the ego vehicle is deactivation of high beam headlights and activation of low beam headlights.

In some embodiments, the ego vehicle is navigable in at least one of an autonomous mode of navigation and a manual mode of navigation.

In some embodiments, each predetermined situation of the plurality of predetermined situations is associated with a respective detection confidence level threshold and the plurality of predetermined situations are tiered based on their associated detection confidence level thresholds.

In some embodiments, the occurrence of the predetermined situation is actual.

In some embodiments, the occurrence of the predetermined situation is predicted.

In some embodiments, the determining occurrence of the predetermined situation is based on at least detection information from a perception subsystem that receives sensor data associated with objects within a range and field of view of the ego vehicle.

In some embodiments, the determining occurrence of the predetermined situation is based on at least map information associated with an environment in which the ego vehicle is traveling.

In some embodiments, the predetermined situation is associated with at least one of detection of moving vehicles, detection of pedestrians and cyclists, and detection of vehicles that have people inside.

In some embodiments, the predetermined situation is associated with at least one of detection of moving light sources and detection of bright lights in an expected path of a lead vehicle or oncoming vehicles.

It should be appreciated that many other embodiments, features, applications, and variations of the present technology will be apparent from the following detailed description and from the accompanying drawings. Additional and alternative implementations of the methods, non-transitory computer readable media, systems, and structures described herein can be employed without departing from the principles of the present technology.

BRIEF DESCRIPTION OF THE DRAWINGS

FIG. 4B is a second illustration relating to a transition in lighting operation, according to embodiments of the present technology.

Figure 1:
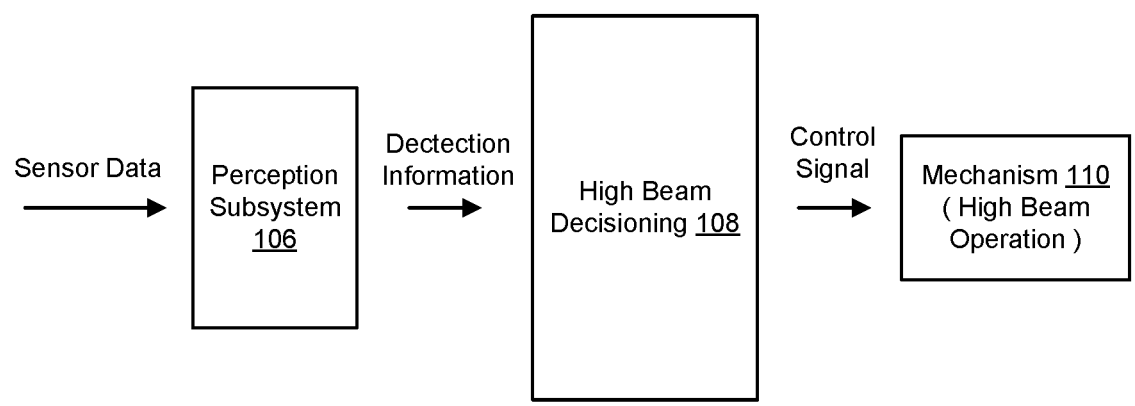
FIG. 1 illustrates an example functional block diagram associated with automatic control of high beam headlights of an ego vehicle, according to embodiments of the present technology.

The figures depict various embodiments of the present technology for purposes of illustration only, wherein the figures use like reference numerals to identify like elements. One skilled in the art will readily recognize from the following discussion that alternative embodiments of the structures and methods illustrated in the figures can be employed without departing from the principles of the present technology described herein.

DETAILED DESCRIPTION

Some vehicles can have both a manual mode of navigation and an autonomous mode of navigation. For example, in an autonomous mode of navigation, which can have different levels of autonomy, motion of an ego vehicle can be planned and controlled. Planning and control functions in the autonomous mode of navigation rely in part on data about the ego vehicle and an environment in which the ego vehicle is traveling, including the position and movement of other vehicles and objects. In the autonomous mode of navigation, various subsystems of the ego vehicle can be automatically controlled. Even when the ego vehicle is in a manual mode of navigation, certain subsystems of the ego vehicle, such as a lighting subsystem, can provide automatic assistance to the driver.

An important function of a lighting subsystem of an ego vehicle is high beam headlight operation. In contrast to low beam headlights, high beam headlights can produce more intense, powerful lighting to enhance navigation visibility across various environmental conditions. In some instances, high beam headlights can project light more than twice as far as low beam headlights, depending on specifications of the lighting subsystem. Thus, activation of high beam headlights can help optimize safety for vehicle navigation in many situations.

However, in other situations, use of high beam headlights can negatively impact safety. High beam headlights, as their name implies, aim light at a higher level than low beam headlights. As a result, the light produced by high beam headlights of an ego vehicle can blind others that fall within the range and field of view of the high beam headlights. Those impacted in this manner can include drivers of other vehicles, other road users (e.g., bicyclists), pedestrians, and the like. When subjected to light produced by high beam headlights, such persons can be blinded, rendering them unable to navigate or proceed accurately or safely. As a result, the possibility of accidents and mishaps increases.

Conventional techniques can deactivate high beam headlights in certain circumstances. Some conventional techniques adhere to legal regulations requiring dimming of high beam headlights in limited situations. For example, certain regulatory requirements (e.g., FMVSS 108 S14.9.3.11) in a jurisdiction provide that, when under automatic control, headlights of an ego vehicle should switch from high (upper) beam to low (lower) beam when a point source of light is detected at certain levels of intensity (or brightness) at various angles. As another example, regulatory requirements in another jurisdiction provide, for example, that high beam headlights of an ego vehicle should be deactivated when another approaching vehicle is within a certain distance of the ego vehicle or when the ego vehicle is following another vehicle that is within a certain distance of the ego vehicle. Conventional techniques based on such types of legal regulations are designed to deactivate high beam headlights only in the conditions specified by the regulations.

However, such conventional techniques pose many disadvantages. The presence of a bright light source, which is the basis of many conventional techniques, does not necessarily indicate another vehicle. Nor does the absence of a bright light source necessarily indicate the absence of another vehicle. In this regard, conventional techniques can generate undue instances of false negatives, where a desirable deactivation of high beam headlights is not performed, and false positives, where an undesirable deactivation of high beam headlights is performed. For example, assume that an ego vehicle with activated high beam headlights is traveling along a curve in a first portion of a road. In this example, assume further that another oncoming vehicle in the range and field of view of the ego vehicle is traveling along the curve in another portion of the road so that the two vehicles are not yet facing one another. In this example, conventional techniques based on regulatory requirements do not deactivate the high beam headlights of the ego vehicle because the conditions addressed by the conventional techniques have not arisen. As a result, the high beam headlights of the ego vehicle are undesirably maintained, potentially impairing the vision of the driver of the other vehicle. In another example, assume that an ego vehicle senses light produced by reflections. The reflections can be caused by, for example, retro reflectors mounted on rear sections (e.g., bumpers) of vehicles, highly reflective road signs, or lane reflectors placed on a road as a lane marker. In this example, conventional techniques based on detection of light intensity levels may erroneously interpret these reflections as headlights of an approaching vehicle and accordingly deactivate high beam headlights of the ego vehicle. As a result, the visibility of the driver of the ego vehicle is needlessly diminished, reducing safety for the driver of the ego vehicle and others in the surroundings of the ego vehicle. Conventional techniques accordingly fail to effectively control high beam headlights in a wide array of situations.

The present technology provides improved approaches for automatic control of a lighting subsystem that overcome the aforementioned and other technological disadvantages. In various embodiments, the present technology can receive sensor data regarding surroundings of an ego vehicle. The sensor data can be analyzed by a perception subsystem of the ego vehicle to detect information about the surroundings, such as light, obstacles, and their motion. The detection information can be analyzed to determine the potential occurrence of one or more of a plurality of predetermined situations in the surroundings of the ego vehicle. Each predetermined situation can be associated with a particular context, circumstance, or scenario that defines or describes conditions in the surroundings under which a state of operation of the lighting subsystem of the ego vehicle should be changed to another state of operation. For example, each predetermined situation can be associated with detection of conditions for which high beam headlights of the ego vehicle should be automatically deactivated (or dimmed, dipped) in favor of low beam headlights. The plurality of predetermined situations can reduce instances of false positives and false negatives otherwise generated by conventional techniques.

Each predetermined situation can be associated with a detection confidence level threshold. The plurality of predetermined situations can be tiered such that a highest priority predetermined situation is associated with a highest detection confidence level threshold and relatively lower priority predetermined situations are associated with relatively lower detection confidence level thresholds. The detection information generated by the perception subsystem of the ego vehicle can be analyzed to determine the possible occurrence of one or more predetermined situations based on associated detection confidence level thresholds. In some instances, a map, such as an advanced driver assisted system (ADAS) map, can be utilized to assist in the determination of an occurrence of a predetermined situation. Upon determination of the occurrence of a predetermined situation, a control signal can be generated and transmitted to a mechanism of the lighting subsystem of the ego vehicle to cause a change to the operation of the lighting subsystem, such as dimming (or lowering) of the high beam headlights in favor of low beam headlights. With hysteresis to avoid oscillating behavior, activation of the high beam headlights can be resumed when occurrence of the predetermined situation has concluded and no other predetermined situations have been detected. These and other inventive features and related advantages of the various embodiments of the present technology are discussed in more detail herein.

FIG. 1 illustrates an example simplified functional block diagram of a system 100 for automatic control of high beam headlights, according to some embodiments of the present technology. In response to detection of certain situations, the system 100 can automatically (without manual intervention) control a lighting subsystem of an ego vehicle to cause deactivation of high beam headlights and activation of low beam headlights. Control of the high beam headlights can include turning on/off, reorienting, dimming, shading, brightening, and adjusting illumination levels of the high beam headlights. The system 100 can be utilized during any mode of navigation of the ego vehicle. For example, the system 100 can be implemented for an autonomous mode of navigation or a manual mode of navigation, or both modes of navigation. In some embodiments, the system 100 can be implemented as or in an automatic high beam (AHB)

system. While examples relating to control of high beam headlights are discussed herein for purposes of illustration, the present technology more generally can apply to cause any desired adjustment of or change to a lighting subsystem from one state of operation to another state of operation.

In the system 100, sensor data can be acquired. The sensor data can be data describing an environment in which an ego vehicle is positioned. For example, the sensor data can describe various types of objects, including obstacles and lights, as well as their movement, in the surroundings of the ego vehicle. The sensor data can be data captured or collected by various types of sensors. In some embodiments, the sensors can be some or all sensors available in or associated with an advanced driver assisted system (ADAS). For example, the sensor data can be provided by any combination of a camera system (e.g., based on visible light, near infrared light, infra-red light), a radar system, and a lidar system. In other examples, the sensor data can be provided by a camera system alone, or a radar system alone, or a lidar system alone. In some embodiments, some or all of the sensor data can be captured by sensors mounted on the ego vehicle for which the system 100 is implemented. In some embodiments, a portion of the sensor data can be captured by other vehicles in a fleet to which the ego vehicle belongs.

The sensor data can be provided to a perception subsystem 106. The perception subsystem 106 can process and analyze the sensor data to detect various types of objects (e.g., lights, obstacles) and their behavior in the environment of the ego vehicle. The perception subsystem 106 can be trained to detect the various types of objects and their behavior to support a determination regarding the possible occurrence of a predetermined situation, as discussed in more detail herein. For example, one or more machine learning models can be trained to detect lights and obstacles (e.g., other vehicles, pedestrians, cyclists, etc.) as well as their movement in the environment based on the sensor data. In contrast to conventional techniques that commonly discard sensor data describing the occurrence of lights in an environment of an ego vehicle, the perception subsystem 106 can be configured to detect lights and determine their possible motion in the environment of an ego vehicle based on the sensor data. In response to provision of sensor data, one or more machine learning models can generate, as applicable, a probability (or likelihood) that a particular object is reflected in the sensor data and a probability that the particular object is in motion. The probabilities can represent confidence levels regarding the detection of the particular object and the determination that the particular object is in motion. The detection of objects, the determinations about their possible motion, and the generation of associated confidence levels are included in detection information generated by the perception subsystem 106 and provided to a high beam decisioning component 108 of the system 100.

The high beam decisioning component 108 can receive a plurality of predetermined situations. Each predetermined situation can be associated with a context, circumstance, scenario, or other conditions that define or describe a particular state of the environment of the ego vehicle for which operation of a lighting subsystem of the ego vehicle should switch or adjust. In some embodiments, a predetermined situation can be associated with detection of certain conditions under which high beam headlights should be automatically deactivated (or dimmed) and low beam headlights should be automatically activated. Further, each predetermined situation can be associated with a detection confidence level threshold that when satisfied indicates that the predetermined situation is occurring. The plurality of predetermined situations can be tiered and prioritized based on their respective detection confidence level thresholds.

The high beam decisioning component 108 of the system 100 can determine whether one or more predetermined situations are occurring in an environment of an ego vehicle. The determination of whether a predetermined situation is occurring can be based in part on the detection information, which includes information regarding the detection of objects, determinations about their possible movement, and related probabilities. In particular, a predetermined situation can be determined (or deemed) to be occurring when a detection confidence level threshold associated with the predetermined situation is satisfied. The detection confidence level threshold associated with the predetermined situation can be potentially satisfied based on the probabilities associated with certain detected objects and their possible movement as specified by the predetermined situation. More details regarding determinations of occurring predetermined situations are provided below.

In response to a determination that a predetermined situation is occurring, a control signal can be generated to cause a change to the lighting subsystem of the ego vehicle, such as automatic switching from high beam headlights to low beam headlights of the ego vehicle. When it is determined that no predetermined situation is occurring, a control signal can be generated to cause automatic switching from low beam headlights to high beam headlights with hysteresis. The control signals can be provided to a mechanism 110 that controls operation of the high beam headlights and the low beam headlights. When the control signal commands deactivation of the high beam headlights, the mechanism 110 can switch from the high beam headlights to the low beam headlights. When the control signal commands activation of the high beam headlights, the mechanism 110 can switch from the low beam headlights to the high beam headlights. In some embodiments, the perception subsystem 106, the high beam decisioning component 108, and the mechanism 110 can be implemented with a perception module 612, a prediction and planning module 616, and a control module 618 of an autonomous system 610 of FIG. 6.

In some embodiments, some or all of the functionality performed by the system 100 may be performed by one or more computing systems implemented in a vehicle. In some embodiments, some or all of the functionality performed by the system 100 may be performed by one or more backend computing systems (e.g., remote from a vehicle). In some embodiments, some or all of the functionality performed by the system 100 may be performed by one or more computing systems associated with (e.g., carried by) one or more users riding in a vehicle. In some embodiments, some or all data processed and/or stored by the system 100 can be stored in a data store (e.g., local to the system 100) or other storage system (e.g., cloud storage remote from the system 100). The components (e.g., modules, elements, etc.) shown in this figure and all figures herein, as well as their described functionality, are exemplary only. Other implementations of the present technology may include additional, fewer, integrated, or different components and related functionality. Some components and related functionality may not be shown or described so as not to obscure relevant details. In various embodiments, one or more of the functionalities described in connection with the system 100 can be implemented in any suitable combinations. Functionalities of the system 100 or variations thereof may be further discussed herein or shown in other figures.

As referenced or suggested herein, autonomous vehicles can include, for example, a fully autonomous vehicle, a partially autonomous vehicle, a vehicle with driver assistance, or an autonomous capable vehicle. The capabilities of autonomous vehicles can be associated with a classification system or taxonomy having tiered levels of autonomy. A classification system can be specified by, for example, industry standards or governmental guidelines. For example, based on the SAE standard, the levels of autonomy can be considered using a taxonomy such as level 0 (momentary driver assistance), level 1 (driver assistance), level 2 (additional assistance), level 3 (conditional assistance), level 4 (high automation), and level 5 (full automation without any driver intervention). Following this example, an autonomous vehicle can be capable of operating, in some instances, in at least one of levels 0 through 5. According to various embodiments, an autonomous capable vehicle may refer to a vehicle that can be operated by a driver manually (that is, without the autonomous capability activated) while being capable of operating in at least one of levels 0 through 5 upon activation of an autonomous mode. As used herein, the term "driver" may refer to a local operator (e.g., an operator in the vehicle) or a remote operator (e.g., an operator physically remote from and not in the vehicle). The autonomous vehicle may operate solely at a given level (e.g., level 2 additional assistance or level 5 full automation) for at least a period of time or during the entire operating time of the autonomous vehicle. Other classification systems can provide other levels of autonomy characterized by different vehicle capabilities.

Figure 2:
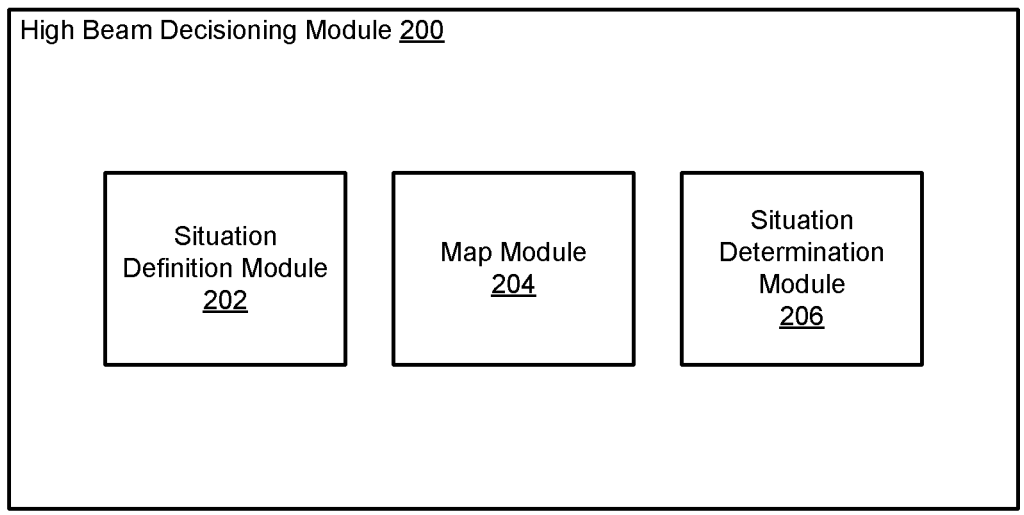
FIG. 2 illustrates an example high beam decisioning module, according to embodiments of the present technology.

FIG. 2 illustrates an example high beam decisioning module 200, according to an embodiment of the present technology. In some embodiments, the high beam decisioning module 200 can be an implementation of the high beam decisioning component 108 of FIG. 1. The high beam decisioning module 200 can receive detection information about the surroundings of an ego vehicle from a perception subsystem. Based on the detection information, the high beam decisioning module 200 can determine whether one or more predetermined situations are occurring. If a predetermined situation is determined to be occurring, the high beam decisioning module 200 can generate a control signal to cause a transition between two states of operation of a lighting subsystem of the ego vehicle, such as switching from high beam headlights to low beam headlights. The high beam decisioning module 200 can include a situation definition module 202, a map module 204, and a situation determination module 206. As stated above, the components (e.g., modules, elements, etc.) shown in this figure and all figures herein, as well as their described functionality, are exemplary only. Other implementations of the present technology may include additional, fewer, integrated, or different components and related functionality.

The situation definition module 202 can allow a plurality of predetermined situations to be described or defined. A predetermined situation can be associated with, for example, any context, circumstance, or scenario that describes or defines a state or conditions of an environment of an ego vehicle for which operation of a lighting subsystem of the ego vehicle should switch or adjust. In some embodiments, a predetermined situation can be associated with a detected state or conditions in the surroundings of the ego vehicle under which high beam headlights of the ego vehicle should be automatically deactivated (or dimmed) and low beam headlights should be automatically activated. Any suitable number of predetermined situations can be described or defined. The number and types of predetermined situations can be configurable for a particular implementation. The situation definition module 202 can support the definition of a plurality of predetermined situations by, for example, a designer of a lighting subsystem of the ego vehicle or a designer of a system of navigation (e.g., autonomous system) utilized by the ego vehicle.

Each predetermined situation can be associated with a selected detection confidence level threshold. A predetermined situation can be determined (or deemed) to be occurring in the surroundings of the ego vehicle based on satisfaction of the associated detection confidence level threshold. The plurality of predetermined situations can be tiered and prioritized based on their respective detection confidence level thresholds. A detection confidence level threshold of a predetermined situation can reflect the difficulty of detecting the predetermined situation. In some embodiments, a lighting subsystem with which the high beam decisioning module 200 is associated can exhibit a level of sensitivity or responsiveness to a predetermined situation based on a detection confidence level threshold associated with the predetermined situation. For example, with respect to switching from one state of operation to another state of operation, a lighting subsystem can be more sensitive or responsive to a predetermined situation having a relatively higher detection confidence level threshold in comparison to another predetermined situation having a relatively lower detection confidence level threshold. For example, a predetermined situation associated with detection of moving vehicles can have a higher detection confidence level threshold than a predetermined situation associated with detection of moving light sources based on a relatively higher difficulty associated with the detection of moving vehicles over the detection of moving light sources. Accordingly, the predetermined situation associated with detection of moving vehicles can be prioritized over the predetermined situation associated with detection of moving light sources. A switch from one state of operation (e.g., high beam headlights on) to another state of operation (e.g., high beam headlights off) can occur in response to a determination of the predetermined situation associated with detection of moving vehicles without a determination of the predetermined situation associated with detection of moving light sources based on the predetermined situation associated with detection of moving vehicles being prioritized over the predetermined situation associated with detection of moving light sources.

Figure 3:
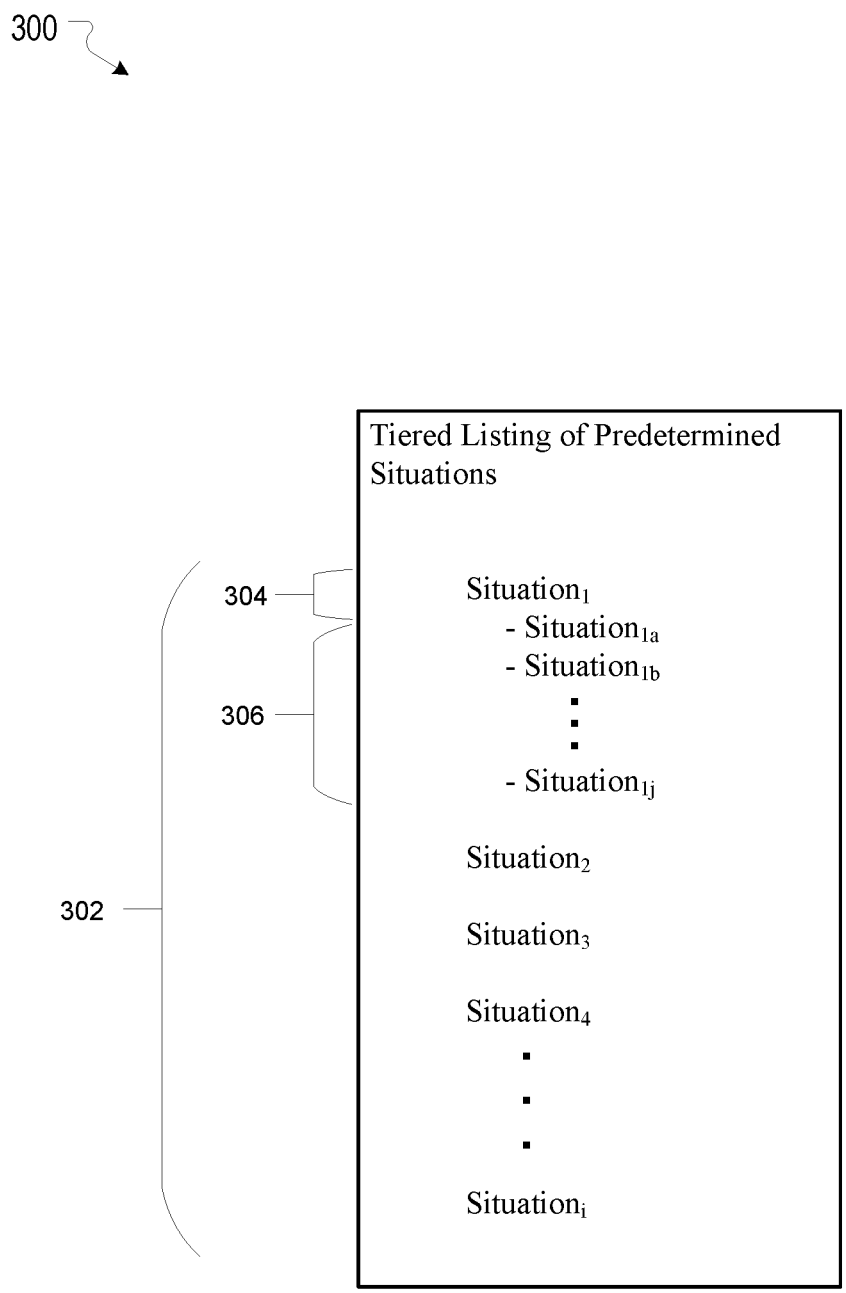
FIG. 3 illustrates an example tiered listing of predetermined situations for which to transition lighting operation, according to embodiments of the present technology.

FIG. 3 illustrates an example listing 300, according to an embodiment of the present technology. The listing 300 can include a plurality of predetermined situations 302 that have been provided to or defined by the situation definition module 202. The listing 300 can include any suitable number of predetermined situations. The plurality of predetermined situations 302 can be tiered in the listing 300. The listing 300 can order the plurality of predetermined situations 302 based on their detection confidence level thresholds. Predetermined situations having relatively higher detection confidence level thresholds can appear higher in the listing 300 than predetermined situations having relatively lower detection confidence level thresholds. In some instances, as shown, a predetermined situation 304 can represent a general category under which narrower predetermined situations 306 can fall.

A listing of a plurality of predetermined situations can include different types of predetermined situations. In some embodiments, the plurality of predetermined situations involve detection of objects that are within the range and the field of view of high beam headlights of an ego vehicle.

Upon a determination that a predetermined situation is occurring, high beam headlights can be deactivated and low beam headlights can be activated. For example, a predetermined situation can be associated with detection of moving vehicles (whether or not the moving vehicles have their lights on). The predetermined situation should cause switching from high beam headlights to low beam headlights. In this example, the predetermined situation associated with detection of moving vehicles can constitute a general category under which narrower predetermined situations can fall. For instance, a predetermined situation that falls under the general category can be associated with detection of a vehicle preceding the ego vehicle, such as a vehicle ahead of the ego vehicle that is moving in the same lane. In this predetermined situation, high beam headlights of the ego vehicle are turned off and low beam headlights are turned on if the distance to the preceding vehicle is below certain calibratable distances. In this predetermined situation, the high beam headlights are not re-activated until the distance to the preceding vehicle is above another calibratable distance (with hysteresis). In another instance, a predetermined situation that falls under the general category can be associated with detection of an oncoming vehicle (i.e., a vehicle moving in a direction opposite to the direction of the ego vehicle). In this predetermined situation, high beam headlights of the ego vehicle are turned off and low beam headlights are turned on when the oncoming vehicle is within the field of view of the ego vehicle. In this predetermined situation, high beam headlights are not re-activated until the oncoming vehicle exits the field of view of the ego vehicle (with hysteresis). In another instance, a predetermined situation that falls under the general category can be associated with detection of a crossing vehicle (i.e., a moving vehicle that crosses the ego lane). In this predetermined situation, high beam headlights of the ego vehicle are turned off and low beam headlights are turned on if the crossing vehicle is on the same road surface as the ego vehicle. The high beam headlights can remain on if the crossing vehicle is not on the same road surface as the ego vehicle.

In another example, a predetermined situation can be associated with detection of pedestrians and cyclists (with or without lights or reflections). In this example, because the basic detection range for a pedestrian or a cyclist (particularly in low light conditions) is limited, a valid detection of a pedestrian or a cyclist should trigger a transition from high beam headlights to low beam headlights.

In still another example, a predetermined situation can be associated with detection of vehicles that have people inside the vehicles (with or without light, moving or not moving). Such vehicles can include vehicles that have a high probability of being active road users but may not have their lights on, may not be visible, or may be stationary (e.g., waiting at an intersection). In this example, detection of vehicles with persons inside should cause high beam headlights to deactivate and low beam headlights to activate.

In a further example, a predetermined situation can be associated with detection of moving lights sources. Laterally moving light sources that have a high probability of coming from a moving vehicle in front of the ego vehicle can be detected. A vehicle may be moving towards the ego vehicle but with enough relative lateral velocity to indicate a moving vehicle, even though its range or velocity may not be explicitly measurable. If the laterally moving light sources indeed correspond to a moving vehicle in the direction of the ego vehicle or the opposite direction, high beam headlights should switch to low beam headlights.

In an additional example, a predetermined situation can be associated with detection of bright lights (e.g., lights that satisfy a threshold level of brightness) in the expected path of a lead vehicle or oncoming vehicles (whether moving or not). Bright light sources that are estimated to be from objects on the road surface of the ego vehicle as indicated by a map of the road network in front of the ego vehicle can be detected. If it is determined that bright light sources correspond to objects moving in the same direction or the opposite direction as the ego vehicle, then the high beam headlights should switch to low beam headlights.

In an additional example, a predetermined situation can be associated with detection of bright lights in a path of the ego vehicle in compliance with regulatory requirements (e.g., FMVSS 108 S14.9.3.11).

The foregoing examples of predetermined situations are merely illustrations. In various embodiments, other predetermined situations can be defined or described to trigger a transition in operation of a lighting subsystem of an ego vehicle, such as a switch from high beam headlight operation to low beam headlight operation. Many variations in the definition or formulation of predetermined situations are possible.

In FIG. 2, the map module 204 can access a map to support the determination of a predetermined situation. For example, the map module 204 can access a data store of an ego vehicle or a central computing system with which the ego vehicle can communicate. The data store can include various types of maps, such as advanced driver assisted systems (ADAS) maps and semantic maps. The map module 204 can access information reflected in the maps to support or confirm detection of predetermined situations. For example, the map module 204 can assist in determination of a possible occurrence of a predetermined situation associated with detection of bright lights in the expected path of a lead vehicle or oncoming vehicles. In this example, the map module 204 can analyze map information to identify the path of a road along which a lead vehicle or oncoming vehicles would be traveling. As another example, the map module 204 can assist in determination of a possible occurrence of a predetermined situation associated with detection of a road intersection that the ego vehicle is approaching. In this example, the map module 204 can analyze map information to determine whether the path of the ego vehicle is approaching a road intersection or to confirm that the ego vehicle is approaching a detected road intersection. As yet another example, the map module 204 can assist in determination of a possible occurrence of a predetermined situation associated with detection of an urban environment to or in which the ego vehicle is traveling. In this example, the map module 204 can analyze map information to identify locations of urban environments to facilitate or confirm their detection. As a further example, the map module 204 can assist in determination of a possible occurrence of a predetermined situation associated with detection of a geographic location where pedestrians are known to frequent (e.g., concert halls, sports auditoriums, etc.). In this example, the map module 204 can analyze map information to identify locations that pedestrians frequent. The foregoing are merely illustrations. Map information can be utilized to assist in or provide confirmation of the detection of objects that are relevant to a wide variety of predetermined situations.

The map module 204 can assist in anticipating and predicting future occurrence of a predetermined situation. For example, based on a pose and trajectory of an ego vehicle, the map module 204 can access features from a map to predict objects that will be within the range and field of view of the ego vehicle. Based on the map, objects associated with a predetermined situation can be predicted to be within the range and field of view of the ego vehicle in the near future (e.g., within a threshold duration of time). In these instances, the predetermined situation can be predicted to occur in the near future. In some embodiments, predicted occurrence of a predetermined situation at a threshold level of probability can cause a change to a lighting subsystem of an ego vehicle from one state of operation to another state of operation before actual occurrence of the predetermined situation.

As just one example, the map module 204 can assist in determining the predicted occurrence of a predetermined situation associated with detection of an oncoming vehicle. In this example, assume that detection information indicates that a vehicle is moving along a curving road ahead of and in the opposite direction from the ego vehicle. Assume further that the detection information also indicates that the vehicle is moving along the curving road but is currently positioned outside of the range and field of view of high beam headlights of the ego vehicle. Accordingly, the predetermined situation associated with detection of an oncoming vehicle is determined to not be actually occurring because the vehicle is not yet detected within the range and field of view of the high beam headlights of the ego vehicle. However, the map module 204 can access map information to assist in a prediction that, based on trajectory information associated with the vehicle and the ego vehicle, the vehicle likely will be within the range and field of view of the ego vehicle within a threshold duration of time. In response to the predicted occurrence of the predetermined situation, the lighting operation of the ego vehicle can be transitioned from high beam headlights to low beam headlights without waiting for the predetermined situation to actually occur.

The situation determination module 206 can determine occurrence of a predetermined situation. Based on the detection information generated by a perception subsystem of the ego vehicle and, as applicable, map information, the situation determination module 206 can determine whether a detection confidence level threshold associated with a predetermined situation is satisfied. When the detection confidence level threshold is satisfied, the situation determination module 206 can determine that the predetermined situation is occurring.

As just one example, the situation determination module 206 can consider a possible occurrence of a predetermined situation associated with detection of bright lights in the expected path of a lead vehicle or oncoming vehicles in relation to an ego vehicle. The situation determination module 206 can analyze the detection information provided by the perception subsystem to determine, for example, the existence and position of bright lights and, if so, at what level of probability. In addition, the situation determination module 206 can obtain map information from the map module 204 to understand road geometry and accordingly to determine a probability that detected bright lights are in the expected path of a lead vehicle or oncoming vehicles. Based on the determinations performed by the situation determination module 206, the situation determination module 206 can determine a probability (or likelihood) that the predetermined situation is occurring. If the probability that the predetermined situation is occurring satisfies a detection confidence level threshold associated with the predetermined situation, the situation determination module 206 can determine (or deem) that the predetermined situation is occurring.

The situation determination module 206 can continuously or at selected frequencies monitor for the possible occurrence of a plurality of predetermined situations. Monitoring for the occurrence of each of the plurality of predetermined situations can be performed in parallel. In some instances, one predetermined situation of the plurality of predetermined situations can be determined to be occurring in a duration of time. In some instances, more than one of the plurality of predetermined situations can be determined to be occurring in a duration of time.

The situation determination module 206 can generate control signals to control operation of the lighting subsystem of the ego vehicle. In response to determination of the occurrence of a predetermined situation, the situation determination module 206 can generate a control signal to cause a first transition in lighting operation. For example, the transition can be switching from high beam headlights to low beam headlights. Upon conclusion (or non-occurrence) of the predetermined situation, the situation determination module 206 can generate a control signal to cause a second transition in lighting operation. For example, the transition can be switching from low beam headlights to high beam headlights. In some embodiments, the situation determination module 206 can generate control signals to cause other types of transitions, apart from transitions between high beam headlights and low beam headlights, in lighting operation. Many variations are possible.

In some embodiments, transitions in lighting operation can be with hysteresis to avoid undesirable oscillating behavior in relation to repeated activation and deactivation of the high beam headlights and the low beam headlights. In this regard, a first threshold can be selected that triggers deactivation of the high beam headlights (or activation of the low beam headlights) and a second threshold different from the first threshold can be selected that triggers activation of the high beam headlights (or deactivation of the low beam headlights). For example, in relation to the predetermined situation associated with detection of bright lights in a path of the ego vehicle in compliance with regulatory requirements, the first threshold can be a first level of brightness and the second threshold can be a second level of brightness that is less than the first level of brightness.

Figure 4A:
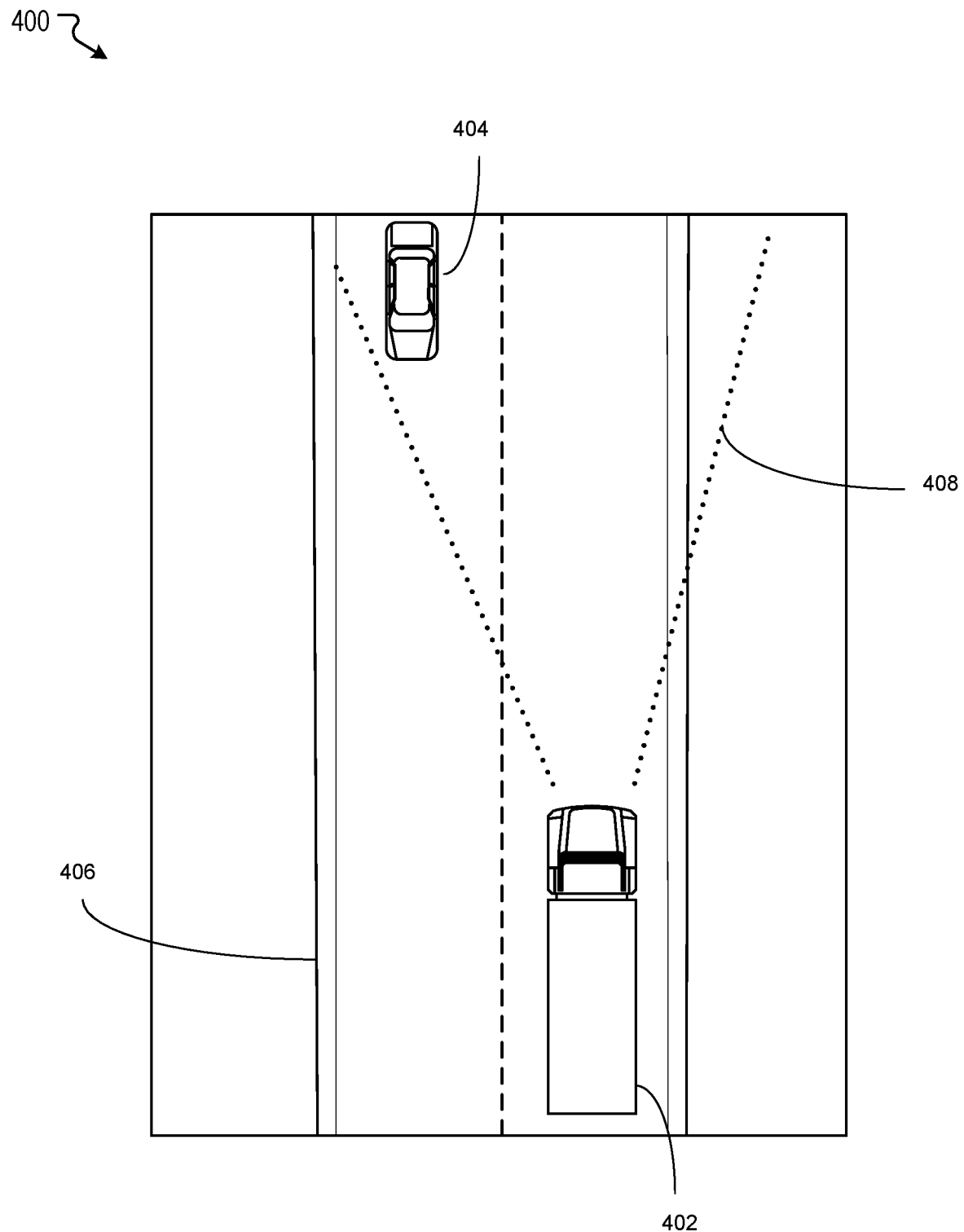
FIG. 4A is a first illustration relating to a transition in lighting operation, according to embodiments of the present technology.

FIG. 4A is an illustration 400 relating to a transition in lighting operation based on occurrence of a predetermined situation, according to an embodiment of the present technology. The illustration 400 relates to automatic switching of light operation from one state to another state by an ego vehicle in which the system 100 is implemented. The automatic switching is performed in response to occurrence of a predetermined situation. The automatic switching can be performed in any mode of navigation of the ego vehicle, such as an autonomous mode of navigation or a manual mode of navigation. As shown, the ego vehicle is a truck 402. The truck 402 and a passenger car 404 are traveling in opposite directions on a road 406. High beam headlights of the truck 402 are activated (on). The high beam headlights of the truck 402 have a range and field of view 408. As shown, the passenger car 404 is within the range and field of view 408 of the truck 402.

Based on detection information relating to the environment of the truck 402, it is determined if any predetermined situations of a plurality of predetermined situations are occurring. For example, the detection information includes a probability about the existence of an oncoming vehicle within the range and field of view 408 of the truck 402. When the probability about the existence of the oncoming vehicle satisfies a detection confidence level threshold associated with the predetermined situation associated with detection of an oncoming vehicle as mentioned above, the predetermined situation is determined to be actually occurring. In response to the determination that the predetermined situation is occurring, the high beam headlights of the truck 402 are automatically switched off (or dimmed) and low beam headlights of the truck are automatically switched on. The illustration 400 is merely an example. In other examples, other predetermined situations can be determined to be occurring.

Figure 4B:
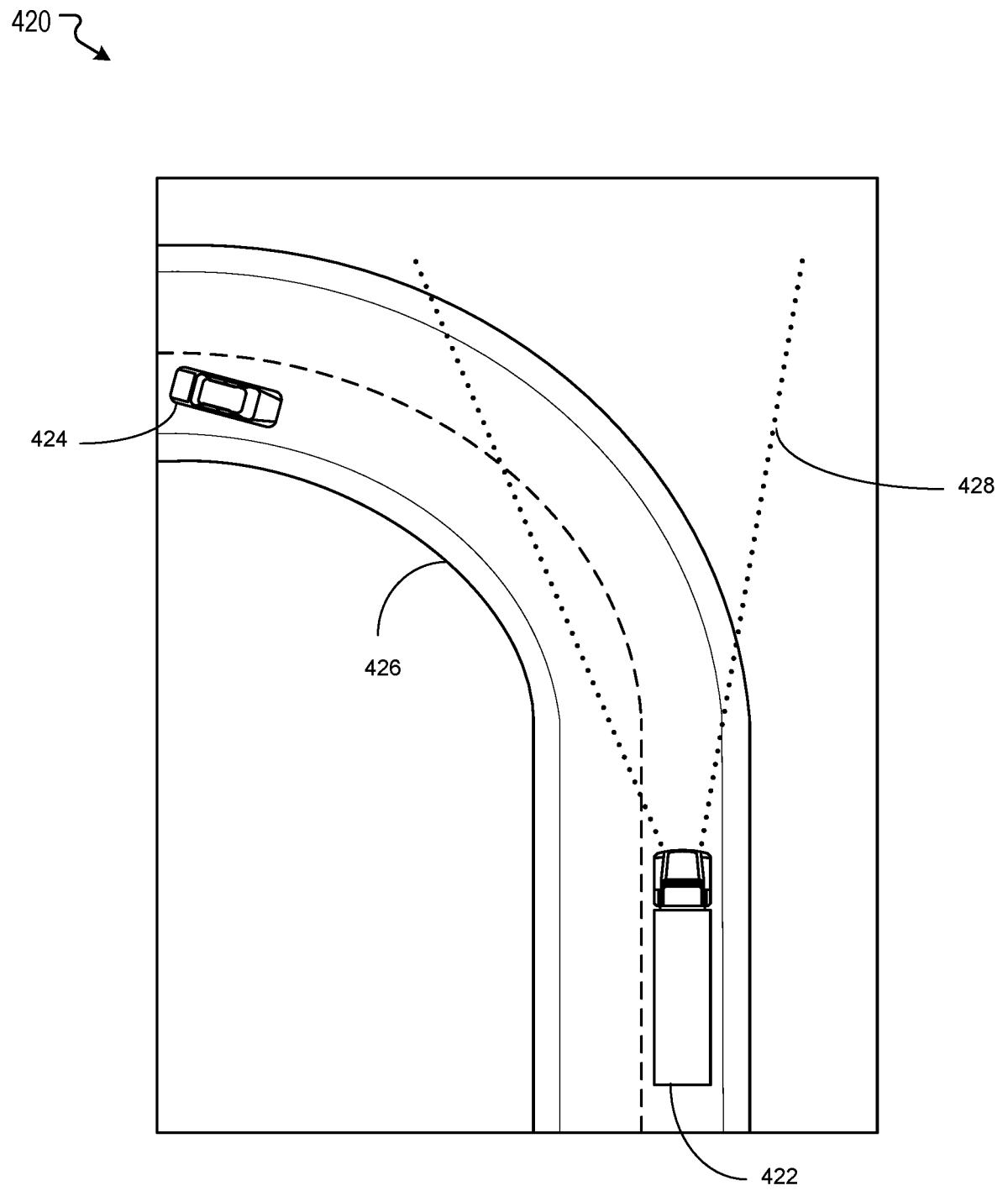

FIG. 4B is an illustration 420 relating to a transition in lighting operation based on occurrence of a predetermined situation, according to an embodiment of the present technology. The illustration 420 relates to automatic switching of light operation by an ego vehicle in which the system 100 is implemented. The automatic switching is performed in response to predicted occurrence of a predetermined situation. The automatic switching can be performed in any mode of navigation of the ego vehicle, such as an autonomous mode of navigation or a manual mode of navigation. As shown, the ego vehicle is a truck 422. The truck 422 and another vehicle 424 are traveling in opposite directions on a road 426. High beam headlights of the truck 422 are activated (on). The high beam headlights of the truck 422 have a range and field of view 428. As shown, the vehicle 424 is outside the range and field of view 428 of the truck 422.

Based on detection information relating to the environment of the truck 422, it is determined if any predetermined situations of a plurality of predetermined situations are occurring. For example, the detection information includes a probability of the existence of an oncoming vehicle within the range and field of view 428 of the truck 422. As discussed, when the probability about the existence of the oncoming vehicle satisfies a detection confidence level threshold associated with a predetermined situation associated with detection of an oncoming vehicle as mentioned above, the predetermined situation associated with detection of an oncoming vehicle is determined to be occurring.

In this example, the vehicle 424 is outside the range and field of view 428 of the truck 422. As a result, the probability of an oncoming vehicle being within the range and field of view of the truck 422 as detected is very low and thus fails to satisfy a detection confidence level threshold associated with the predetermined situation. However, detection information about the trajectory of the vehicle 424 and map information regarding the geometry of the road 426 indicate that the vehicle 424 soon (i.e., within a selected duration of time) will enter the range and field of view 428 of the truck 422. As a result, the predetermined situation associated with detection of an oncoming vehicle is predicted to occur within the selected duration of time with a probability that satisfies the associated detection confidence level threshold. The predicted occurrence of the predetermined situation causes the high beam headlights of the truck 422 to switch off and the low beam headlights of the truck 422 to switch on. In this example, safety provided by dimming the high beam headlights of the truck 422 in response to predicted occurrence of the predetermined situation can be advantageously achieved before the actual occurrence of the predetermined situation. Many other examples are possible.

Figure 5:
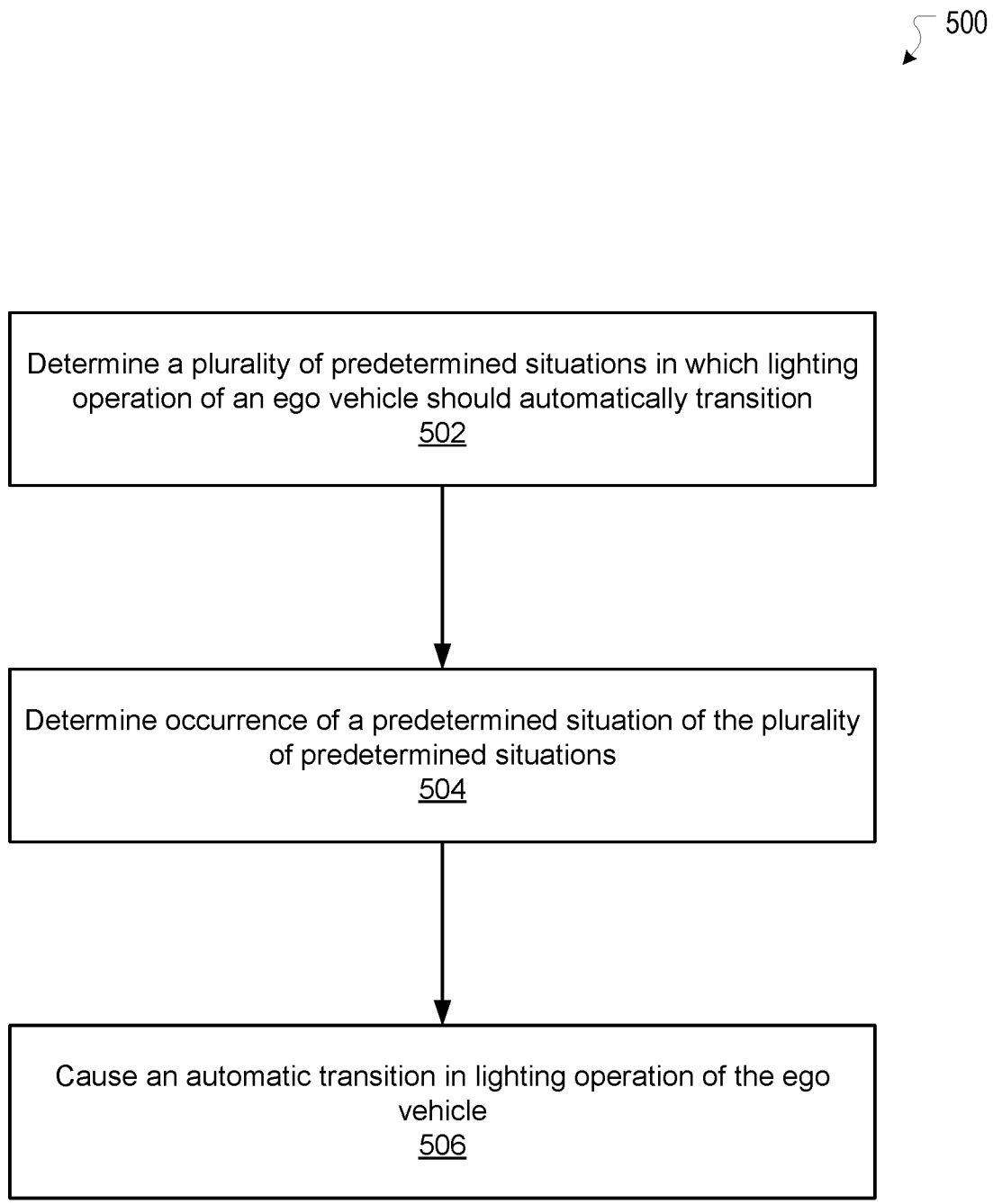
FIG. 5 illustrates an example method, according to embodiments of the present technology.

FIG. 5 illustrates an example method 500, according to embodiments of the present technology. At block 502, the method 500 determines a plurality of predetermined situations in which lighting operation of an ego vehicle should automatically transition. At block 504, the method 500 determines occurrence of a predetermined situation of the plurality of predetermined situations. At block 506, the method 500 causes an automatic transition in lighting operation of the ego vehicle. Many variations to the example method are possible. It should be appreciated that there can be additional, fewer, or alternative steps performed in similar or alternative orders, or in parallel, within the scope of the various embodiments discussed herein unless otherwise stated.

It is contemplated that there can be many other uses, applications, and/or variations associated with the various embodiments of the present technology. For example, various embodiments of the present technology can learn, improve, and/or be refined over time.

Example Implementations

Figure 6:
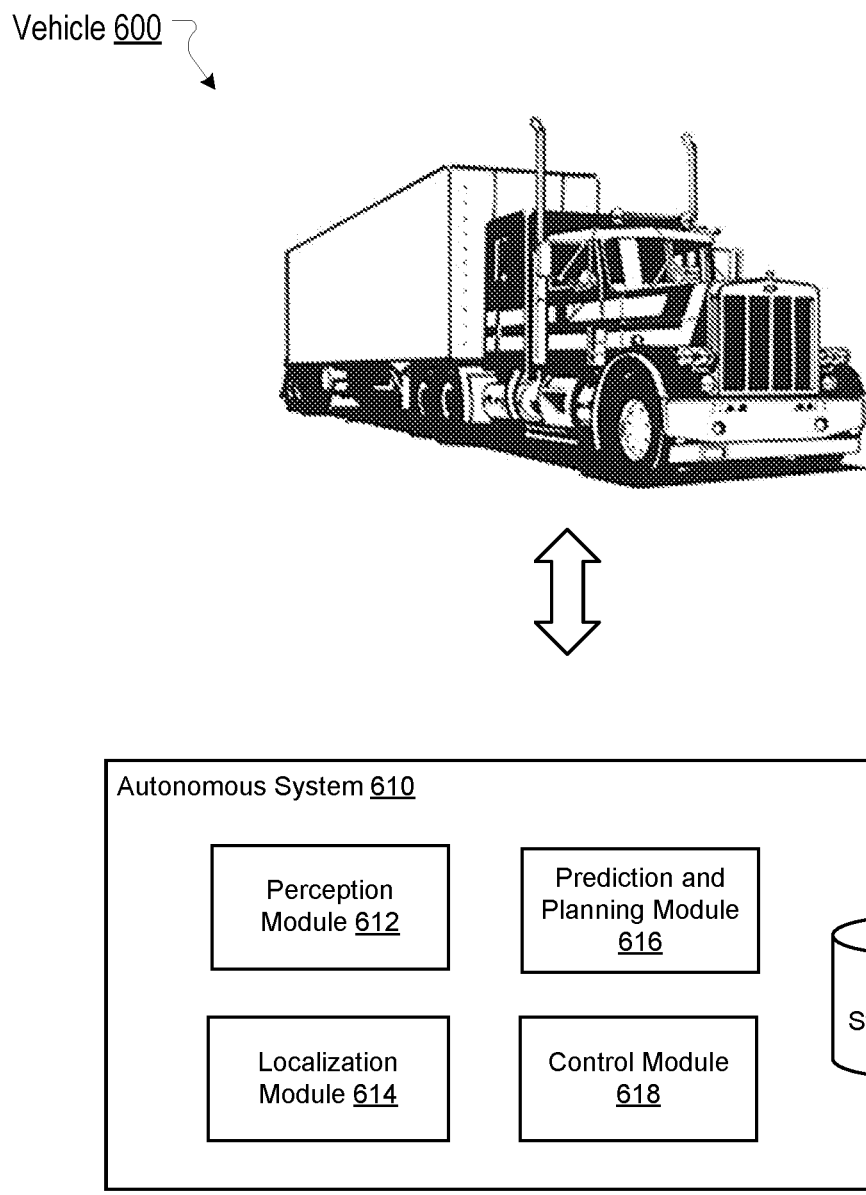
FIG. 6 illustrates an example vehicle, according to embodiments of the present technology.

FIG. 6 illustrates a vehicle 600 including an autonomous system 610, according to various embodiments of the present technology. The functionality and operation of the present technology, including the autonomous system 610, can be implemented in whole or in part by the vehicle 600. The present technology can cause desired control and navigation of the vehicle 600, as described herein. In some embodiments, the vehicle 600 is a truck, which can include a trailer. The truck can be of any size (e.g., medium truck, heavy truck, very heavy truck, etc.) or weight (e.g., greater than 14,000 pounds, greater than 26,000 pounds, greater than 70,000 pounds, etc.). The autonomous system 610 of the vehicle 600 can support and execute various modes of navigation of the vehicle 600. The autonomous system 610 can support and execute an autonomous driving mode, a semi-autonomous driving mode, and a driver assisted driving mode of the vehicle 600. The autonomous system 610 also can enable a manual driving mode. For operation of the vehicle 600, the autonomous system 610 can execute or enable one or more of the autonomous driving mode, the semi-autonomous driving mode, the driver assisted driving mode, and the manual driving mode, and selectively transition among the driving modes based on a variety of factors, such as operating conditions, vehicle capabilities, and driver preferences.

In some embodiments, the autonomous system 610 can include, for example, a perception module 612, a localization module 614, a prediction and planning module 616, and a control module 618. The functionality of the perception module 612, the localization module 614, the prediction and planning module 616, and the control module 618 of the autonomous system 610 are described in brief for purposes of illustration. As mentioned, the components (e.g., modules, elements, etc.) shown in this figure and all figures herein, as well as their described functionality, are exemplary only. Other implementations of the present technology may include additional, fewer, integrated, or different components and related functionality. Some components and related functionality may not be shown or described so as not to obscure relevant details. In various embodiments, one or more of the functionalities described in connection with the autonomous system 610 can be implemented in any suitable combinations.

The perception module 612 can receive and analyze various types of data about an environment in which the vehicle 600 is located. Through analysis of the various types of data, the perception module 612 can perceive the environment of the vehicle 600 and provide the vehicle 600 with critical information so that planning of navigation of the vehicle 600 is safe and effective. For example, the perception module 612 can determine the pose, trajectories, size, shape, and type of obstacles in the environment of the vehicle 600. Various models, such as machine learning models, can be utilized in such determinations.

The various types of data received by the perception module 612 can be any data that is supportive of the functionality and operation of the present technology. For example, the data can be attributes of the vehicle 600, such as location, velocity, acceleration, weight, and height of the vehicle 600. As another example, the data can relate to topographical features in the environment of the vehicle 600, such as traffic lights, road signs, lane markers, landmarks, buildings, structures, trees, curbs, bodies of water, etc. As yet another example, the data can be attributes of dynamic obstacles in the surroundings of the vehicle 600, such as location, velocity, acceleration, size, type, and movement of vehicles, persons, animals, road hazards, etc.

Sensors can be utilized to capture the data. The sensors can include, for example, cameras, radar, LiDAR (light detection and ranging), GPS (global positioning system), IMUs (inertial measurement units), and sonar. The sensors can be appropriately positioned at various locations (e.g., front, back, sides, top, bottom) on or in the vehicle 600 to optimize the collection of data. The data also can be captured by sensors that are not mounted on or in the vehicle 600, such as data captured by another vehicle (e.g., another truck) or by non-vehicular sensors located in the environment of the vehicle 600.

The localization module 614 can determine the pose of the vehicle 600. Pose of the vehicle 600 can be determined in relation to a map of an environment in which the vehicle 600 is traveling. Based on data received by the vehicle 600, the localization module 614 can determine distances and directions of features in the environment of the vehicle 600. The localization module 614 can compare features detected in the data with features in a map (e.g., HD map) to determine the pose of the vehicle 600 in relation to the map. The features in the map can include, for example, traffic lights, crosswalks, road signs, lanes, road connections, stop lines, etc. The localization module 614 can allow the vehicle 600 to determine its location with a high level of precision that supports optimal navigation of the vehicle 600 through the environment.

The prediction and planning module 616 can plan motion of the vehicle 600 from a start location to a destination location. The prediction and planning module 616 can generate a route plan, which reflects high level objectives, such as selection of different roads to travel from the start location to the destination location. The prediction and planning module 616 also can generate a behavioral plan with more local focus. For example, a behavioral plan can relate to various actions, such as changing lanes, merging onto an exit lane, turning left, passing another vehicle, etc. In addition, the prediction and planning module 616 can generate a motion plan for the vehicle 800 that navigates the vehicle 600 in relation to the predicted location and movement of other obstacles so that collisions are avoided. The prediction and planning module 616 can perform its planning operations subject to certain constraints. The constraints can be, for example, to ensure safety, to minimize costs, and to enhance comfort.

Based on output from the prediction and planning module 616, the control module 618 can generate control signals that can be communicated to different parts of the vehicle 600 to implement planned vehicle movement. The control module 618 can provide control signals as commands to actuator subsystems of the vehicle 600 to generate desired movement. The actuator subsystems can perform various functions of the vehicle 600, such as braking, acceleration, steering, signaling, etc.

The autonomous system 610 can include a data store 620. The data store 620 can be configured to store and maintain information that supports and enables operation of the vehicle 600 and functionality of the autonomous system 610. The information can include, for example, instructions to perform the functionality of the autonomous system 610, data captured by sensors, data received from a remote computing system, parameter values reflecting vehicle states, map data, machine learning models, algorithms, vehicle operation rules and constraints, navigation plans, etc.

The autonomous system 610 of the vehicle 600 can communicate over a communications network with other computing systems to support navigation of the vehicle 600. The communications network can be any suitable network through which data can be transferred between computing systems. Communications over the communications network involving the vehicle 600 can be performed in real time (or near real time) to support navigation of the vehicle 600.

The autonomous system 610 can communicate with a remote computing system (e.g., server, server farm, peer computing system) over the communications network. The remote computing system can include an autonomous system, and perform some or all of the functionality of the autonomous system 610. In some embodiments, the functionality of the autonomous system 610 can be distributed between the vehicle 600 and the remote computing system to support navigation of the vehicle 600. For example, some functionality of the autonomous system 610 can be performed by the remote computing system and other functionality of the autonomous system 610 can be performed by the vehicle 600. In some embodiments, a fleet of vehicles including the vehicle 600 can communicate data captured by the fleet to a remote computing system controlled by a provider of fleet management services. The remote computing system in turn can aggregate and process the data captured by the fleet. The processed data can be selectively communicated to the fleet, including vehicle 600, to assist in navigation of the fleet as well as the vehicle 600 in particular. In some embodiments, the autonomous system 610 of the vehicle 600 can directly communicate with a remote computing system of another vehicle. For example, data captured by the other vehicle can be provided to the vehicle 600 to support navigation of the vehicle 600, and vice versa. The vehicle 600 and the other vehicle can be owned by the same entity in some instances. In other instances, the vehicle 600 and the other vehicle can be owned by different entities.

In various embodiments, the functionalities described herein with respect to the present technology can be implemented, in part or in whole, as software, hardware, or any combination thereof. In some cases, the functionalities described with respect to the present technology can be implemented, in part or in whole, as software running on one or more computing devices or systems. In a further example, the functionalities described with respect to the present technology can be implemented using one or more computing devices or systems that include one or more servers, such as network servers or cloud servers. It should be understood that there can be many variations or other possibilities.

Figure 7:
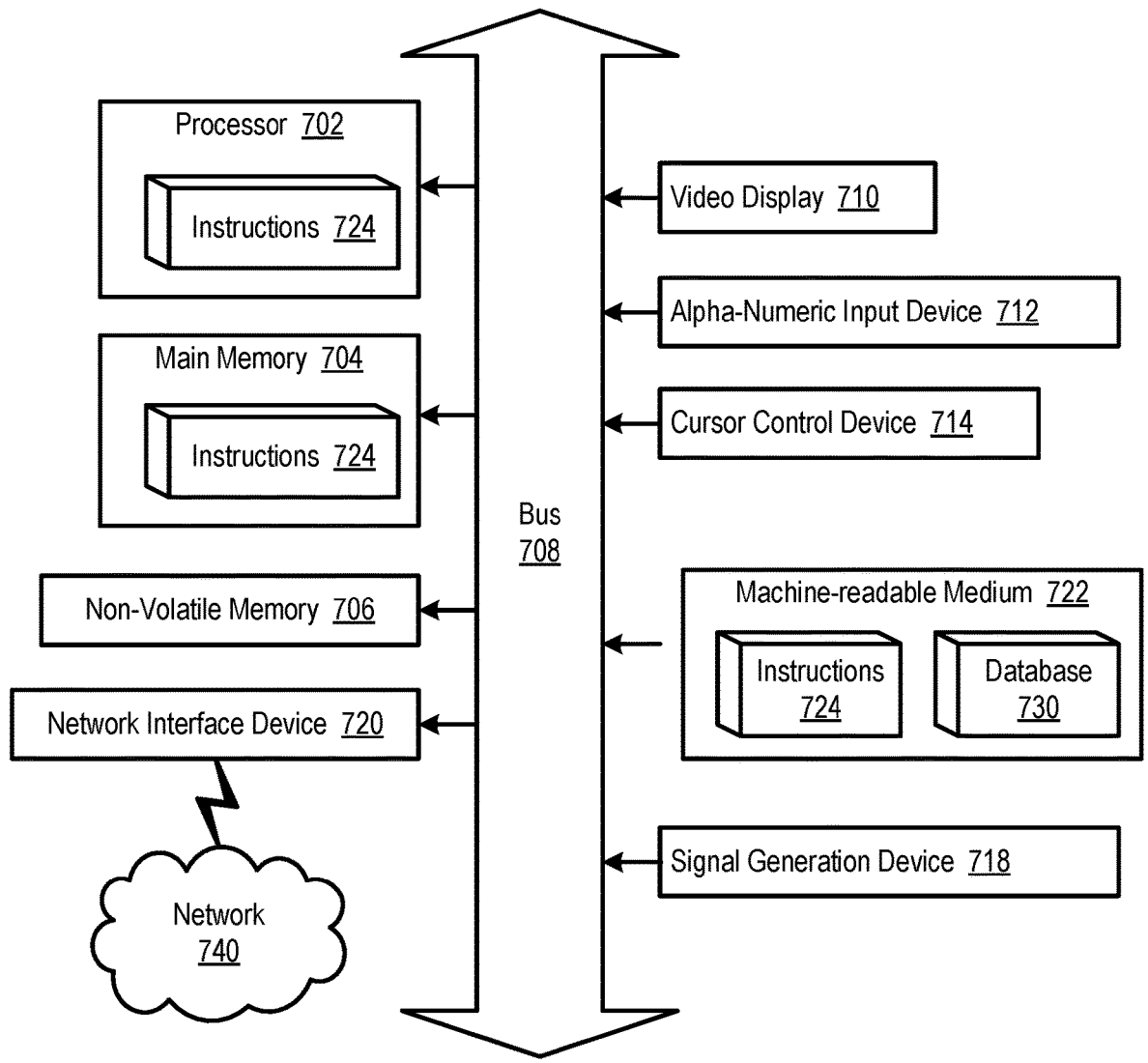
FIG. 7 illustrates an example computing system, according to embodiments of the present technology.

FIG. 7 illustrates an example of a computer system 700 that may be used to implement one or more of the embodiments of the present technology. The computer system 700 can be included in a wide variety of local and remote machine and computer system architectures and in a wide variety of network and computing environments that can implement the functionalities of the present technology. The computer system 700 includes sets of instructions 724 for causing the computer system 700 to perform the functionality, features, and operations discussed herein. The computer system 700 may be connected (e.g., networked) to other machines and/or computer systems. In a networked deployment, the computer system 700 may operate in the capacity of a server or a client machine in a client-server network environment, or as a peer machine in a peer-to-peer (or distributed) network environment.

The computer system 700 includes a processor 702 (e.g., a central processing unit (CPU), a graphics processing unit (GPU), or both), a main memory 704, and a nonvolatile memory 706 (e.g., volatile RAM and non-volatile RAM, respectively), which communicate with each other via a bus 708. In some embodiments, the computer system 700 can be a desktop computer, a laptop computer, personal digital assistant (PDA), or mobile phone, for example. In one embodiment, the computer system 700 also includes a video display 710, an alphanumeric input device 712 (e.g., a keyboard), a cursor control device 714 (e.g., a mouse), a signal generation device 718 (e.g., a speaker) and a network interface device 720.

In one embodiment, the video display 710 includes a touch sensitive screen for user input. In one embodiment, the touch sensitive screen is used instead of a keyboard and mouse. A machine-readable medium 722 can store one or more sets of instructions 724 (e.g., software) embodying any one or more of the methodologies, functions, or operations described herein. The instructions 724 can also reside, completely or at least partially, within the main memory 704 and/or within the processor 702 during execution thereof by the computer system 700. The instructions 724 can further be transmitted or received over a network 740 via the network interface device 720. In some embodiments, the machine-readable medium 722 also includes a database 730.

Volatile RAM may be implemented as dynamic RAM (DRAM), which requires power continually in order to refresh or maintain the data in the memory. Non-volatile memory is typically a magnetic hard drive, a magnetic optical drive, an optical drive (e.g., a DVD RAM), or other type of memory system that maintains data even after power is removed from the system. The non-volatile memory 706 may also be a random access memory. The non-volatile memory 706 can be a local device coupled directly to the rest of the components in the computer system 700. A non-volatile memory that is remote from the system, such as a network storage device coupled to any of the computer systems described herein through a network interface such as a modem or Ethernet interface, can also be used.

While the machine-readable medium 722 is shown in an exemplary embodiment to be a single medium, the term "machine-readable medium" should be taken to include a single medium or multiple media (e.g., a centralized or distributed database, and/or associated caches and servers) that store the one or more sets of instructions. The term "machine-readable medium" shall also be taken to include any medium that is capable of storing, encoding, or carrying a set of instructions for execution by the machine and that cause the machine to perform any one or more of the methodologies of the present technology. Examples of machine-readable media (or computer-readable media) include, but are not limited to, recordable type media such as volatile and non-volatile memory devices; solid state memories; floppy and other removable disks; hard disk drives; magnetic media; optical disks (e.g., Compact Disk Read-Only Memory (CD ROMS), Digital Versatile Disks (DVDs)); other similar non-transitory (or transitory), tangible (or non-tangible) storage medium; or any type of medium suitable for storing, encoding, or carrying a series of instructions for execution by the computer system 700 to perform any one or more of the processes and features described herein.

In general, routines executed to implement the embodiments of the invention can be implemented as part of an operating system or a specific application, component, program, object, module, or sequence of instructions referred to as "programs" or "applications." For example, one or more programs or applications can be used to execute any or all of the functionality, techniques, and processes described herein. The programs or applications typically comprise one or more instructions set at various times in various memory and storage devices in the machine and that, when read and executed by one or more processors, cause the computing system 600 to perform operations to execute elements involving the various aspects of the embodiments described herein.

The executable routines and data may be stored in various places, including, for example, ROM, volatile RAM, non-volatile memory, and/or cache memory. Portions of these routines and/or data may be stored in any one of these storage devices. Further, the routines and data can be obtained from centralized servers or peer-to-peer networks. Different portions of the routines and data can be obtained from different centralized servers and/or peer-to-peer networks at different times and in different communication sessions, or in a same communication session. The routines and data can be obtained in entirety prior to the execution of the applications. Alternatively, portions of the routines and data can be obtained dynamically, just in time, when needed for execution. Thus, it is not required that the routines and data be on a machine-readable medium in entirety at a particular instance of time.

While embodiments have been described fully in the context of computing systems, those skilled in the art will appreciate that the various embodiments are capable of being distributed as a program product in a variety of forms, and that the embodiments described herein apply equally regardless of the particular type of machine- or computer-readable media used to actually affect the distribution.

Alternatively, or in combination, the embodiments described herein can be implemented using special purpose circuitry, with or without software instructions, such as using Application-Specific Integrated Circuit (ASIC) or Field-Programmable Gate Array (FPGA). Embodiments can be implemented using hardwired circuitry without software instructions, or in combination with software instructions. Thus, the techniques are limited neither to any specific combination of hardware circuitry and software, nor to any particular source for the instructions executed by the data processing system.

For purposes of explanation, numerous specific details are set forth in order to provide a thorough understanding of the description. It will be apparent, however, to one skilled in the art that embodiments of the technology can be practiced without these specific details. In some instances, modules, structures, processes, features, and devices are shown in block diagram form in order to avoid obscuring the description or discussed herein. In other instances, functional block diagrams and flow diagrams are shown to represent data and logic flows. The components of block diagrams and flow diagrams (e.g., modules, engines, blocks, structures, devices, features, etc.) may be variously combined, separated, removed, reordered, and replaced in a manner other than as expressly described and depicted herein.

Reference in this specification to "one embodiment," "an embodiment," "other embodiments," "another embodiment," "in some embodiments," "in various embodiments," "in an example," "in one implementation," or the like means that a particular feature, design, structure, or characteristic described in connection with the embodiment is included in at least one embodiment of the technology. The appearances of, for example, the phrases "according to an embodiment," "in one embodiment," "in an embodiment," "in various embodiments," or "in another embodiment" in various places in the specification are not necessarily all referring to the same embodiment, nor are separate or alternative embodiments mutually exclusive of other embodiments. Moreover, whether or not there is express reference to an "embodiment" or the like, various features are described, which may be variously combined and included in some embodiments but also variously omitted in other embodiments. Similarly, various features are described which may be preferences or requirements for some embodiments but not other embodiments.

Although embodiments have been described with reference to specific exemplary embodiments, it will be evident that the various modifications and changes can be made to these embodiments. Accordingly, the specification and drawings are to be regarded in an illustrative sense rather than in a restrictive sense. The foregoing specification provides a description with reference to specific exemplary embodiments. It will be evident that various modifications can be made thereto without departing from the broader spirit and scope as set forth in the following claims. The specification and drawings are, accordingly, to be regarded in an illustrative sense rather than a restrictive sense.

Although some of the drawings illustrate a number of operations or method steps in a particular order, steps that are not order dependent may be reordered and other steps may be combined or omitted. While some reordering or other groupings are specifically mentioned, others will be apparent to those of ordinary skill in the art and so do not present an exhaustive list of alternatives. Moreover, it should be recognized that the stages could be implemented in hardware, firmware, software, or any combination thereof.

It should also be understood that a variety of changes may be made without departing from the essence of the invention. Such changes are also implicitly included in the description. They still fall within the scope of this invention. It should be understood that this technology is intended to yield a patent covering numerous aspects of the invention, both independently and as an overall system, and in method, computer readable medium, and apparatus modes.

Further, each of the various elements of the invention and claims may also be achieved in a variety of manners. This technology should be understood to encompass each such variation, be it a variation of an embodiment of any apparatus (or system) embodiment, a method or process embodiment, a computer readable medium embodiment, or even merely a variation of any element of these.

Further, the use of the transitional phrase "comprising" is used to maintain the "open-end" claims herein, according to traditional claim interpretation. Thus, unless the context requires otherwise, it should be understood that the term "comprise" or variations such as "comprises" or "comprising," are intended to imply the inclusion of a stated element or step or group of elements or steps, but not the exclusion of any other element or step or group of elements or steps. Such terms should be interpreted in their most expansive forms so as to afford the applicant the broadest coverage legally permissible in accordance with the following claims.

The language used herein has been principally selected for readability and instructional purposes, and it may not have been selected to delineate or circumscribe the inventive subject matter. It is therefore intended that the scope of the invention be limited not by this detailed description, but rather by any claims that issue on an application based hereon. Accordingly, the technology of the embodiments of the invention is intended to be illustrative, but not limiting, of the scope of the invention, which is set forth in the following claims.

What is claimed is:

1. A computer-implemented method comprising:
   maintaining, by a computing system, information associated with a plurality of predetermined situations in which lighting operation of an ego vehicle should automatically transition;
   predicting, by the computing system, an occurrence of a predetermined situation of the plurality of predetermined situations, wherein the predetermined situation is detection of a facility where pedestrians frequent as indicated in a map; and
   causing, by the computing system, an automatic transition in lighting operation of the ego vehicle in response to a determination that the predetermined situation will occur within a threshold duration of time, wherein the automatic transition in lighting operation of the ego vehicle is deactivation of high beam headlights and activation of low beam headlights.

2. The computer-implemented method of claim 1, wherein the ego vehicle is navigable in a plurality of modes of navigation, the plurality of modes of navigation including an autonomous mode of navigation and a manual mode of navigation.

3. The computer-implemented method of claim 1, wherein each predetermined situation of the plurality of predetermined situations is associated with a respective detection confidence level threshold and the plurality of predetermined situations are tiered based on their associated detection confidence level thresholds such that a highest priority predetermined situation is associated with a highest detection confidence level threshold.

4. The computer-implemented method of claim 1, wherein the occurrence of the predetermined situation follows prediction of the occurrence.

5. The computer-implemented method of claim 1, wherein the predicting occurrence of the predetermined situation is based at least in part on trajectory information associated with the ego vehicle.

6. The computer-implemented method of claim 1, wherein the predicting occurrence of the predetermined situation is based on at least detection information from a perception subsystem that receives sensor data associated with objects within a range and field of view of the ego vehicle.

7. The computer-implemented method of claim 1, wherein the predicting occurrence of the predetermined situation is based on at least map information associated with an environment in which the ego vehicle is traveling.

8. The computer-implemented method of claim 1, wherein the predetermined situation is associated with at least one of detection of moving vehicles, detection of pedestrians and cyclists, and detection of vehicles that have people inside.

9. The computer-implemented method of claim 1, wherein the predetermined situation is associated with at least one of detection of moving light sources and detection of bright lights in an expected path of a lead vehicle.

10. A system comprising:
   at least one processor; and
   a memory storing instructions that, when executed by the at least one processor, cause the system to perform operations comprising:
      maintaining information associated with a plurality of predetermined situations in which lighting operation of an ego vehicle should automatically transition;
      predicting an occurrence of a predetermined situation of the plurality of predetermined situations, wherein the predetermined situation is detection of a facility where pedestrians frequent as indicated in a map; and
      causing an automatic transition in lighting operation of the ego vehicle in response to a prediction that the predetermined situation will occur within a threshold duration of time, wherein the automatic transition in lighting operation of the ego vehicle is deactivation of high beam headlights and activation of low beam headlights.

11. The system of claim 10, wherein the automatic transition in lighting operation of the ego vehicle is deactivation of high beam headlights and activation of low beam headlights.

12. The system of claim 10, wherein the ego vehicle is navigable in a plurality of modes of navigation, the plurality of modes of navigation including an autonomous mode of navigation and a manual mode of navigation.

13. The system of claim 10, wherein each predetermined situation of the plurality of predetermined situations is associated with a respective detection confidence level threshold and the plurality of predetermined situations are tiered based on their associated detection confidence level thresholds such that a highest priority predetermined situation is associated with a highest detection confidence level threshold.

14. The system of claim 10, wherein the occurrence of the predetermined situation follows prediction of the occurrence.

15. The system of claim 10, wherein the predicting occurrence of the predetermined situation is based at least in part on trajectory information associated with the ego vehicle.

16. A non-transitory computer-readable storage medium including instructions that, when executed by at least one processor of a computing system, cause the computing system to perform operations comprising:
   maintaining information associated with a plurality of predetermined situations in which lighting operation of an ego vehicle should automatically transition;
   predicting an occurrence of a predetermined situation of the plurality of predetermined situations, wherein the predetermined situation is detection of a facility where pedestrians frequent as indicated in a map; and
   causing an automatic transition in lighting operation of the ego vehicle in response to a prediction that the predetermined situation will occur within a threshold duration of time, wherein the automatic transition in lighting operation of the ego vehicle is deactivation of high beam headlights and activation of low beam headlights.

17. The non-transitory computer-readable storage medium of claim 16, wherein the automatic transition in lighting operation of the ego vehicle is deactivation of high beam headlights and activation of low beam headlights.

18. The non-transitory computer-readable storage medium of claim 16, wherein the ego vehicle is navigable in a plurality of modes of navigation, the plurality of modes of navigation including an autonomous mode of navigation and a manual mode of navigation.

19. The non-transitory computer-readable storage medium of claim 16, wherein each predetermined situation of the plurality of predetermined situations is associated with a respective detection confidence level threshold and the plurality of predetermined situations are tiered based on their associated detection confidence level thresholds such that a highest priority predetermined situation is associated with a highest detection confidence level threshold.

20. The non-transitory computer-readable storage medium of claim 16, wherein the predicting occurrence of the predetermined situation is based at least in part on trajectory information associated with the ego vehicle.

* * * * *